United States Patent [19]
Heuschen et al.

[11] Patent Number: 4,504,624
[45] Date of Patent: Mar. 12, 1985

[54] COMPOSITION AND PROCESS

[75] Inventors: Jean M. H. Heuschen, Halsteren; Jan Bussink, Bergen op Zoom; Willem L. Sederel, Roosendaal, all of Netherlands

[73] Assignee: General Electric Company, Mt. Vernon, Ind.

[21] Appl. No.: 559,778

[22] Filed: Dec. 9, 1983

[30] Foreign Application Priority Data

Feb. 14, 1983 [NL] Netherlands .......................... 8300537

[51] Int. Cl.³ .............................................. C08L 69/00
[52] U.S. Cl. ...................................... 525/67; 525/71; 525/902
[58] Field of Search ........................... 525/67, 71, 902; 52.8/196

[56] References Cited

U.S. PATENT DOCUMENTS 3,882,192  5/1975  Elghani et al. ...................... 525/67
3,991,009  11/1976 Margotte et al. ..................... 525/67
4,105,711  8/1978  Hardt et al. ........................... 525/67

FOREIGN PATENT DOCUMENTS 2304894  8/1974  Fed. Rep. of Germany ........ 525/67

Primary Examiner—Theodore E. Pertilla
Attorney, Agent, or Firm—Martin B. Barancik

[57] ABSTRACT

A polymer mixture comprising polyvinyl chloride, an aromatic polycarbonate and a rubber like polymer, characterized in that the rubber like polymer is a graft copolymer which is built up from a rubber like main chain with predominantly alkyl acrylate units on which styrene, α-methylstyrene, acrylonitrile, methacrylic acid esters, acrylic acid esters or mixtures thereof have been grafted.

6 Claims, No Drawings

COMPOSITION AND PROCESS

BACKGROUND OF THE INVENTION

Polymer mixtures comprising a polyvinyl chloride, an aromatic polycarbonate and a rubber like polymer are known from German patent application 23 04 894 (corresponding to U.S. Pat. No. 3,882,192) and German patent Specification 24 02 176 (corresponding to U.S. Pat. No. 4,105,711). The polymer mixtures according to German patent application 23 04 894 comprise an ABS graft copolymer or an ethylene vinyl acetate copolymer as a rubber like polymer. The polymer mixtures according to German Patent Specification 24 02 176 comprise a particular polycarbonate derived from a bis-(3,5-dimethyl-4-hydroxyphenyl) compound, for example, bis-(3,5-dimethyl- 4-hydroxyphenyl)propane. As a rubber like polymer these known mixtures comprise a "rubber or a rubber modified thermoplastic polymerizate". Preferably used rubber modified thermoplastic polymerizates are graft copolymers consisting of polybutadiene rubber or a butadiene copolymer on which styrene, α-methylstyrene, acrylonitrile, methacrylic acid esters or mixtures thereof have been grafted.

The invention provides new polymer mixtures having better mechanical properties, in particular a better ductility, than the above-mentioned known polymer mixtures. The polymer mixtures according to the invention comprise an aromatic polycarbonate which may be derived from all bis-(4-hydroxyphenyl) compounds usual for polycarbonates.

DESCRIPTION OF THE INVENTION

The polymer mixtures according to the invention comprising a polyvinyl chloride, an aromatic polycarbonate and a rubber like polymer are characterized in that the rubber like polymer is a graft copolymer which is built up from a rubber like main chain having predominantly alkylacrylate units on which styrene, α-methyl styrene, acrylonitrile, methacrylic acid esters, acrylic acid esters or mixtures thereof have been grafted.

The polymer mixtures according to the invention may comprise 5–90% by weight, preferably 40–80% by weight, of polyvinyl chloride, 10–95% by weight, preferably 20–60% by weight, of aromatic polycarbonate, and 1–40% by weight preferably 5–15% by weight, of the rubber like polymer.

As a rubber like polymer the polymer mixtures according to the invention preferably comprise a graft copolymer built up from a core having predominantly rubber like alkyl acrylate units, around which one or more shells from styrene, α-methyl stryene, acrylonitrile, methacrylic acid esters, acrylic acid esters or mixtures thereof have been grafted by a graft reaction.

Polyvinyl chloride (PVC) is to be understood to mean in this Specification any polymer and copolymer which is built up for at least 70 mole % from units derived from vinyl chloride monomer. The vinyl chloride may be copolymerized with, for example, vinylidene chloride, vinylidene fluoride, vinyl esters, for example, vinyl acetate, (meth) acrylic acid (esters), amides and nitrile compounds of (meth) acrylic acid, maleic acid esters and semi-esters, respectively, maleic imide, vinyl ether and olefinic unsaturated hydrocarbons, for example ethylene, propene.

A PVC having a K-value (according to Fikentscher, measured in a 1% cyclohexanone solution of 23° C.) of 50–75 is preferably used. The PVC may be prepared by emulsion polymerization or suspension or also mass polymerization.

The polymer mixtures according to the invention preferably comprise a polyvinyl chloride which has been premixed with stabilizers for PVC. As stabilizers may be used the additives usual for PVC, for example, stabilizers on the basis of lead, barium/cadmium, calcium/zinc and organic tin compounds.

Aromatic polycarbonate is to be understood to mean homopolycarbonates, copolycarbonates and mixtures of various homo- and copolycarbonates which comprise units derived from one or several aromatic compounds having at least two hydroxy groups. The polymer mixtures according to the invention preferably comprise polycarbonates which comprise units of bis-(hydroxyphenyl) alkanes which are not substituted or are substituted in the aromatic nucleus with one or more halogen atoms, for example, 2,2-bis(hydroxyphenyl) propane c.q. halogen derivative thereof.

The aromatic polycarbonates as used in the polymer mixtures according to the invention may have a weight averaged molecular weight of 10,000–200,000, preferably from 10,000 to 20,000.

The rubber like polymers according to the invention comprise a rubber like main chain. Rubber like is to be understood to mean herein that the main chain has a glass transition temperature of less than 10° C., preferably of less than −20° C. The main chain is built up predominantly, i.e., for more than 50 mole %, from alkylacrylate units. Suitable alkylacrylate units are those derived from $C_3$–$C_8$ alkylacrylates, in particular from n-butylacrylate. The main chain may be built up from a copolymer; for that purpose, the alkylacrylate may be copolymerized with any monomer suitable for that purpose, for example, styrene, styrene derivatives, methacrylic acid esters, acrylonitrile, and the like, the ester portion being formed from alkyl of one to eight carbon atoms. The main chain may be crosslinked with a cross-linking agent (for example, with a diacrylate such as butylene diacrylate). One or more different monomers are grafted on the main chain. Suitable monomers are styrene, α-methyl styrene, acrylonitrile, methacrylic acid esters, acrylic acid esters or mixtures thereof, the ester portion being formed from alkyl of one to eight carbon atoms.

As rubber like polymers are preferably used graft copolymers consisting of a rubber like core, corresponding to the above-mentioned main chain, and one or more shells provided therearound in one or more steps by a graft reaction on the core, c.q. the first shell. Such graft copolymers are known per se, for example, from U.S. Pat. Nos. 3,426,101 and 3,808,180 and the European patent application 50 265 and 50 262.

In addition to the above-mentioned constituents, the polymer mixtures according to the invention may comprise any further additives which are usual for PVC and PC; pigments and dyes, additives to obtain flame retarding properties, additives to improve the impact strength, additives to improve the processability, for example, lubricants and also fillers.

The polymer mixtures according to the invention may be formed into articles according to the methods which are usual for thermoplastic materials.

The polymer mixtures according to the invention can be prepared by dry mixing, extruding, mixing of solutions of the various constituents or while using melting methods. It is to be preferred first to mix the aromatic polycarbonate (PC) with the rubber like polymer, for example, by extrusion. A PC containing premixture is then obtained. The premixture thus obtained can be mixed in the PVC at comparatively low temperatures (below about 220° C.), for example, also by extrusion. When the PVC is first mixed with the rubber like polymer or when the three constituents are mixed simultaneously, temperatures above 220° C. are required upon extrusion. At such temperatures decomposition of the PVC may occur.

The polymer mixtures according to the invention have a structure consisting of a dispersion of rubber particles in one or several PVC-PC phases. In the PVC-PC phases the polycarbonate and the polyvinyl chloride are both molecularly dispersely distributed.

EXAMPLE I

A polycarbonate rubber mixture was prepared by mixing, at 250° C. in a single blade extruder, 80 parts by weight of an aromatic polycarbonate with 20 parts by weight of KM 323 B of Rohm & Haas Co. (a graft copolymer built up from approximately 65% polybutyl acrylate having grafted thereon approximately 35% methymethacrylate). The polycarbonate was the homopolymer derived from 2,2-bis(4-hydroxyphenyl) propane and phosgene having a weight averaged molecular weight of 18,000. 55 parts by weight of polyvinyl chloride (having a K-value according to Fikentscher of 66) were softened at 200° C. while adding 0.8 parts by weight of an organic tin compound (Harochem T 201 of Haagen Chemie B.V.) and 0.3 parts by weight of a conventional lubricant (AC-316 A of Allied Chemical Company). The softened PVC was then mixed at 200° C. with 45 parts by weight of the polycarbonate rubber mixture; the resulting polymer mixture was then processed on an injection molding machine to standardized test pieces for determining the mechanical properties. The mechanical properties of the test pieces were determined. The results obtained recorded in Table A below.

EXAMPLE II

A polymer mixture consisting of 45 parts by weight of stabilized PVC with 55 parts by weight of a polycarbonate rubber mixture was prepared in the same manner and with the same starting materials as described in Example I. The results obtained are also recorded in Table I. For comparison, the mechanical properties are recorded in Table A of the polymer mixture according to Example 6 of German patent application 23 04 894, i.e., of a polymer mixture having 50 parts by weight of PVC, 40 parts by weight of polycarbonate and 10 parts by weight of ABS. It will be obvious from the table that the polymer mixtures according to the invention have a much better ductility than the known mixture.

TABLE A

| | Example I | Example II | Example 6 acc. to DE-AS 23 04 894 |
|---|---|---|---|
| Impact strength at room temperature (DIN 53453) kJ/m$^2$ | no rupture | no rupture | no rupture |
| Impact strength of test piece with notch at room temperature (DIN 53453) kJ/m$^2$ | 36 | 39 | 7 |
| Vicat deformation temp. (DIN 53460;VST/B) °C. | 100 | 110 | 102 |

What is claimed is:

1. A polymer mixture comprising polyvinyl chloride, an aromatic polycarbonate and a rubber like polymer, characterized in that the rubber like polymer is a graft copolymer which is built up from a rubber like main chain with predominantly alkyl acrylate units on which styrene, α-methylstyrene, acrylonitrile, methacrylic acid esters, acrylic acid esters or mixtures thereof have been grafted.

2. A polymer mixture as claimed in claim 1, characterized in that the mixture comprises 5–90% by weight of polyvinyl chloride, 10–95% by weight of aromatic polycarbonate, and 1–40% by weight of the rubber like polymer.

3. A polymer mixture as claimed in claim 1, characterized in that the aromatic polycarbonate has a weight averaged molecular weight between 10,000 and 20,000.

4. A polymer mixture as claimed in claim 1, characterized in that the rubber like polymer is built up from a core of predominantly rubber like alkylacrylate units around which one or more shells have been provided by a graft reaction.

5. A method of preparing a polymer mixture as claimed in claim 1, characterized in that the aromatic polycarbonate is first mixed with the rubber like polymer and the resulting mixture is mixed with the polyvinyl chloride.

6. Articles formed from the polymer mixture as claimed in claim 1.

* * * * *